(12) United States Patent
Rossetti

(10) Patent No.: US 11,117,632 B2
(45) Date of Patent: Sep. 14, 2021

(54) RIDER'S SEAT FOR A TWO-WHEELED VEHICLE

(71) Applicant: Audi AG, Ingolstadt (DE)

(72) Inventor: Mario Rossetti, Neudenau (DE)

(73) Assignee: Audi AG, Ingolstadt (DE)

( * ) Notice: Subject to any disclaimer, the term of this patent is extended or adjusted under 35 U.S.C. 154(b) by 123 days.

(21) Appl. No.: 16/605,142

(22) PCT Filed: Apr. 13, 2018

(86) PCT No.: PCT/EP2018/059497
§ 371 (c)(1),
(2) Date: Oct. 14, 2019

(87) PCT Pub. No.: WO2018/189359
PCT Pub. Date: Oct. 18, 2018

(65) Prior Publication Data
US 2021/0101656 A1 Apr. 8, 2021

(30) Foreign Application Priority Data
Apr. 15, 2017 (DE) ...................... 10 2017 003 686.1

(51) Int. Cl.
*B60N 2/16* (2006.01)
*B62J 1/02* (2006.01)
(Continued)

(52) U.S. Cl.
CPC ................. *B62J 1/02* (2013.01); *B62J 43/10* (2020.02); *B62M 7/00* (2013.01)

(58) Field of Classification Search
CPC .... A63C 17/28; B62J 1/04; B62J 1/08; B60N 2/06
See application file for complete search history.

(56) References Cited

U.S. PATENT DOCUMENTS 4,546,991 A * 10/1985 Allen ...................... B62K 9/02
280/278
6,729,692 B1 * 5/2004 Chou ...................... A47C 3/26
297/463.1
(Continued)

FOREIGN PATENT DOCUMENTS

CN 2136186 Y 6/1993
CN 204915354 U 12/2015
(Continued)

OTHER PUBLICATIONS

International Preliminary Report on Patentability directed to related International Patent Application No. PCT/EP2018/059497, dated Apr. 2, 2019, with attached English-language translation, 9 pages.
(Continued)

*Primary Examiner* — Sarah B McPartlin
(74) *Attorney, Agent, or Firm* — Sterne, Kessler, Goldstein & Fox P.L.L.C.

(57) ABSTRACT

A rider's seat for a two-wheeled vehicle, in particular a scooter, includes a seating body and a bracket connecting the seating body to a body of the two-wheeled vehicle. The bracket is displaceable relative to the body of the two-wheeled vehicle along a longitudinal direction of the two-wheeled vehicle. The seating body is displaceable relative to the bracket at least along a vertical direction of the two-wheeled vehicle. The seating body is partially received within a guide of the bracket such that the guide of the bracket directs displacement of the seating body at least along the vertical direction of the two-wheeled vehicle. The guide of the bracket includes a curvilinear profile.

15 Claims, 5 Drawing Sheets

(51) Int. Cl.
*B62J 43/10* (2020.01)
*B62M 7/00* (2010.01)

(56) References Cited

U.S. PATENT DOCUMENTS

| | | | |
|---|---|---|---|
| 2009/0256378 | A1 | 10/2009 | Hibi et al. |
| 2010/0187873 | A1* | 7/2010 | Geyer ........................ B62J 1/28 |
| | | | 297/215.13 |
| 2012/0139207 | A1* | 6/2012 | Ferreira ..................... B62J 1/08 |
| | | | 280/287 |
| 2014/0175249 | A1* | 6/2014 | Becker ................. B60N 2/0232 |
| | | | 248/429 |
| 2016/0304147 | A1 | 10/2016 | Mangini |

FOREIGN PATENT DOCUMENTS

| | | |
|---|---|---|
| CN | 105936309 A | 9/2016 |
| DE | 1732798 U | 10/1956 |
| DE | 1004509 B | 3/1957 |
| DE | 202004005320 U1 | 6/2004 |
| DE | 202012103613 U1 | 10/2012 |
| GB | 830467 A | 3/1960 |
| JP | H0485185 A | 3/1992 |
| JP | 2004-352165 A | 12/2004 |

OTHER PUBLICATIONS

International Search Report and Written Opinion of the International Searching Authority directed to related International Patent Application No. PCT/EP2018/059497, with attached English-language translation, dated Jul. 23, 2018; 16 pages.
English-language machine translation for German patent publication DE 1004509 B, published Nov. 23, 1955; 8 pages.

* cited by examiner

RIDER'S SEAT FOR A TWO-WHEELED VEHICLE

TECHNICAL FIELD

The invention relates to a rider's seat for a two-wheeled vehicle, in particular a scooter, having a seating surface and a bracket for connecting the seating surface to a body of the two-wheeled vehicle.

BACKGROUND

Such two-wheeled rider's seats are known from the general prior art. A problem with all known solutions is the fact that the position of the seating surface, in particular with respect to a steering handle of the two-wheeled vehicle, generally is only suitable for a certain number of persons. A rider for whom the rider's seat is too close or too far away from the steering handle or too low or too high, is not able to use the two-wheeled vehicle or can use it only partially. In a particular seating position, it may even happen, that due to this seating position, a traffic hazard is caused.

From CN 105 936 309 A a generic rider's seat for a two-wheeled vehicle is known.

US 2016/304147 A1 describes another rider's seat for a two-wheeled vehicle.

DE 10 04 509 B discloses a rider's seat for a two-wheeled vehicle with a seating surface and a bracket for connecting the seating surface to the body of the two-wheeled vehicle. The bracket is displaceable in the longitudinal direction of the two-wheeled vehicle.

JP H04-85 185 A describes a rider's seat for a two-wheeled vehicle with a seating surface and a bracket for connecting the seating surface to the body of the two-wheeled vehicle. The seating surface is displaceable with respect to the bracket in the vertical direction of the two-wheeled vehicle.

DE 17 32 798 U discloses a rider's seat for a two-wheeled vehicle with a seating surface and a bracket for connecting the seating surface to the body of the two-wheeled vehicle. In this case, the bracket can be adjusted both in the longitudinal direction and in the vertical direction relative to the body.

However, all of the mentioned rider's seats do not yet provide an ergonomically mature solution, especially with respect to very small or very tall riders.

It is therefore an object of the present invention to provide a rider's seat for a two-wheeled vehicle, which is suitable for a larger group of people.

According to the invention, this object is achieved by the features mentioned in claim 1.

SUMMARY OF INVENTION

According to the invention, the rider's seat is displaceable in two spatial directions due to the displaceability of the bracket in the longitudinal direction of the body and the displaceability of the seating surface in the vertical direction of the bracket, so that an optimum adjustment of the rider's seat to the body size of the user and thus an optimal posture thereof on the two-wheeled vehicle is achieved. As a result, a comfortable and safe operation of the two-wheeled vehicle provided with the rider's seat according to the invention is ensured for people of any height and any body type.

Due to the fact that the seating surface is guided in a guide of the bracket, the adjustment of the seating surface with respect to the bracket is particularly simple.

Due to the fact that the guide, in which the seating surface is guided within the bracket, has a curvilinear profile, not only provides a pleasing appearance of the rider's seat, but the fact is also taken into account, that people with smaller body size should not only be seated lower, but also closer to a steering handle.

With respect to the usability of the rider's seat according to the invention, it is of particular advantage if, in a very advantageous development of the invention, the seating surface is designed as a double seat bench.

In order to enable an easy displaceability of the bracket relative to the body, in a further embodiment of the invention it may be foreseen that the bracket is guided in a guide of the body.

This results in a particularly good adaptability of the rider's seat to the respective user when the bracket is continuously displaceable in the guide of the body and is lockable with respect to the body. Moreover, due the lockability of the bracket, a fixing of the position thereof and thus a traffic-safe operation of the two-wheeled vehicle is ensured.

It can be provided that the bracket is lockable with respect to the body by means of a quick-release mechanism. In this way, a very simple and secure locking of the bracket relative to the body is possible.

Furthermore, it can be provided that the seating surface is guided in a guide of the bracket. In this way, the seat can be easily adjusted relative to the bracket.

If the guide, in which the seat is guided in the bracket, has a curvilinear profile, not only a pleasing appearance of the rider's seat is guaranteed, but the fact is also taken into account, that people with smaller body size should not only be seated lower, but also closer to a steering handle.

In a further, very advantageous embodiment of the invention, it can be foreseen that the bracket has a storage compartment. This allows an additional housing of everyday objects of the user or also of means required for the operation of the two-wheeled vehicle, so that the usability of the rider's seat according to the invention for the two-wheeled vehicle is substantially increased.

In a further advantageous embodiment of the invention, it can be foreseen, that at least parts of a drive means of the two-wheeled vehicle are arranged within the bracket. As a result, an otherwise unused space is put to meaningful use, so that the space problems always present in such two-wheeled vehicles are prevented.

For example, it may be provided that an electric motor, a transmission and/or a battery are arranged within the bracket.

Further advantageous embodiments and developments of the invention will be apparent from the remaining dependent claims. In the following, an exemplary embodiment of the invention is illustrated in principle with reference to the drawing.

DETAILED DESCRIPTION OF THE FIGURES

Figure 1:
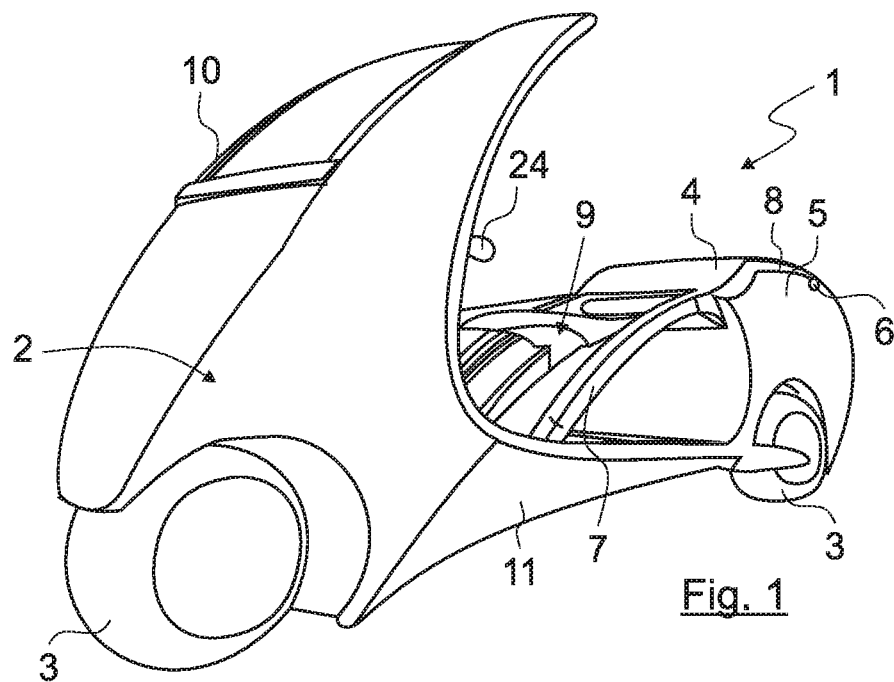
FIG. 1 is a perspective view of a two-wheeled vehicle with a roof element in a first position.

FIG. 1 shows a two-wheeled vehicle 1, in the present case a scooter, having body 2. Two wheels 3, among other things, are mounted on the body 2, as evident in the side views of FIGS. 2 and 3.

Figure 2:
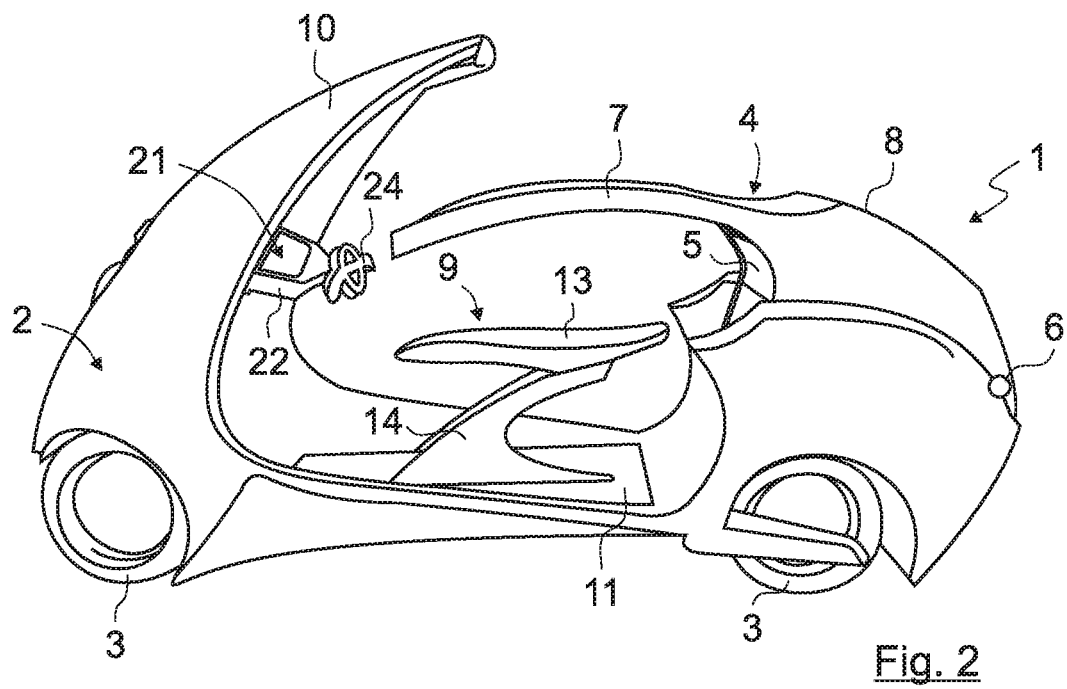
FIG. 2 is a side view of the two-wheeled vehicle from FIG. 1 with the roof element in an intermediate position.
Figure 3:
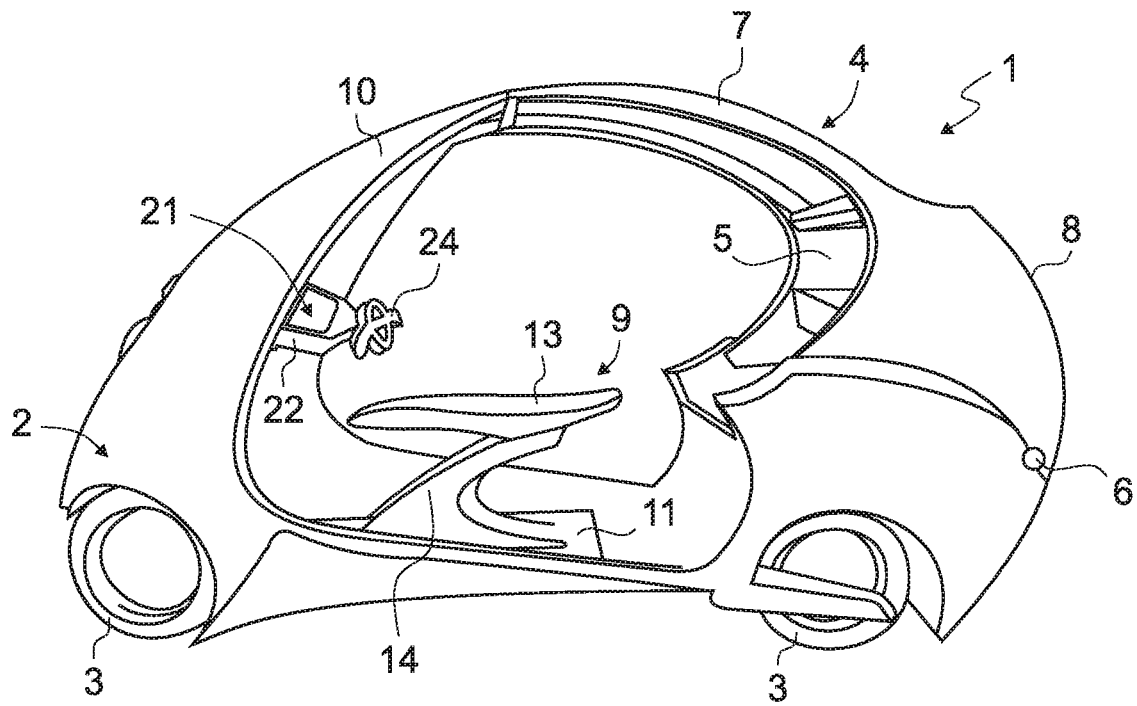
FIG. 3 shows the two-wheeled vehicle of FIG. 2 with the roof element in a second position.

The body 2 has a roof element 4 and a storage compartment 5. As described in detail below, the roof element 4 is rotatably mounted about an axis of rotation 6 between at least two positions. In particular, FIG. 1 shows a first, lower position of the roof element 4, FIG. 2 shows an intermediate position of the roof element 4 and FIG. 3 shows a second, upper position of the same. The axis of rotation 6 is provided in this case in a rear region of the body 2, resulting in an optimum usability of the storage compartment 5. The axis of rotation 6 of the roof element 4 relative to the body 2 can be realized in any known manner.

Figure 4:
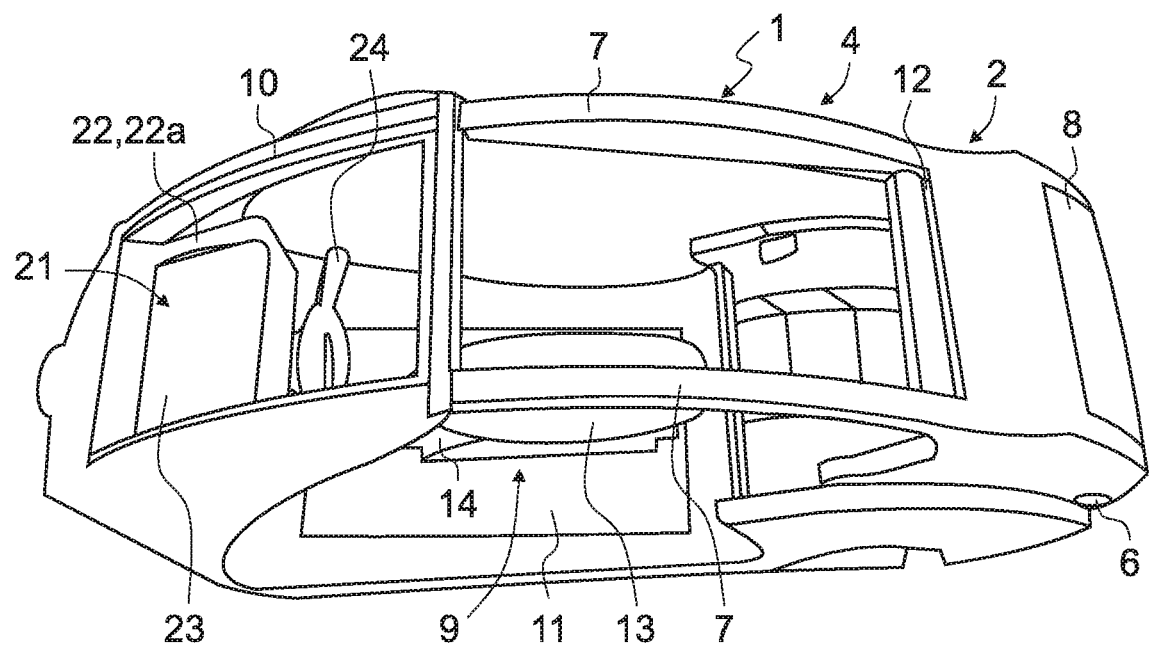
FIG. 4 shows a plan view of the two-wheeled vehicle according to FIGS. 1 to 3.
Figure 5:
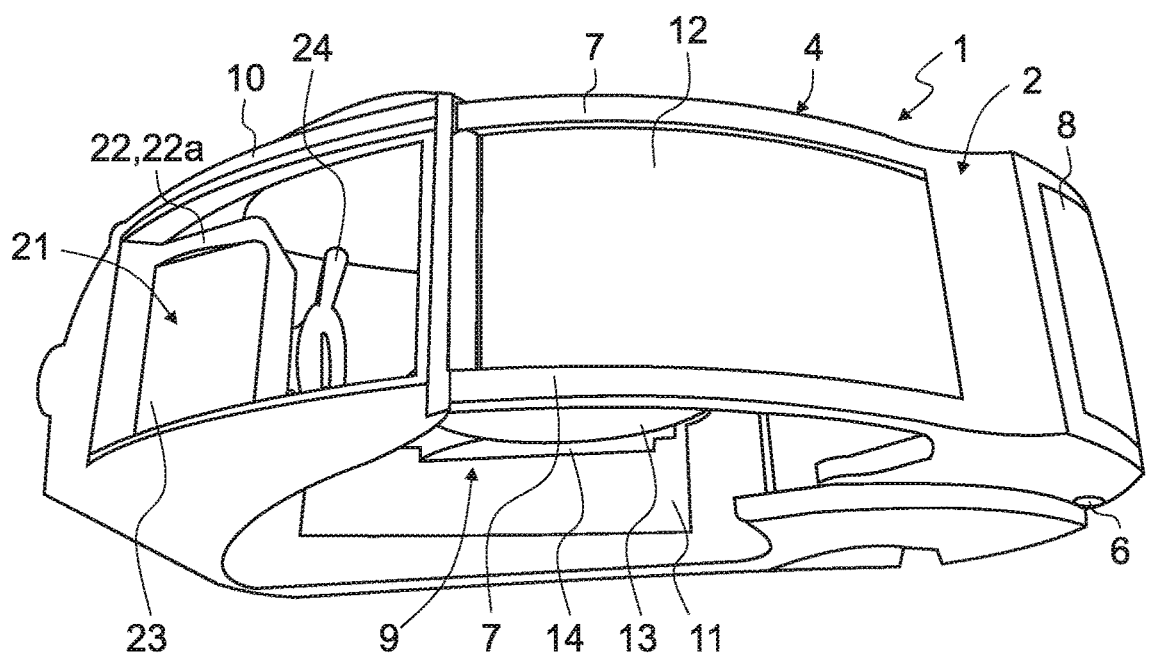
FIG. 5 shows a plan view according to FIG. 4 with a cover element in another position.

As can also be seen in FIGS. 1 to 3 and in the plan views of FIGS. 4 and 5, the roof element 4 has two mutually parallel roof spars or roof struts 7. The roof struts 7 are connected to a cover 8 for the storage compartment 5 or are integral with the same, which is also part of the roof element 4 and is moved therewith.

In FIG. 1 it can be seen that in the first, lower position of the roof element 4, the roof struts 7 are arranged laterally of a rider's seat 9 of the body 2 of the two-wheeled vehicle 1. In this first, lower position of the roof element 4, the storage compartment 5 has a reduced volume and is closed by the cover 8. In contrast, in the second, upper position of the roof element 4, the roof struts 7 are arranged above the rider's seat 9 and the storage compartment 5 has an enlarged volume. The volume of the storage compartment 5, in this position of the roof element 4, may be 120-150 liters, for example. In this position shown in FIG. 3, of the roof element 4, a rider positioned on the rider's seat 9, not shown, may directly access the storage compartment 5, as the same is open in this position of the roof element 4. Basically, it would be conceivable to close this opening of the storage compartment 5 in the direction of the rider by means of a roller blind or a similar separator means.

Due to the described configuration of the roof element 4, the two-wheeled vehicle 1 may be operated in the lower position of the roof element 4 as a conventional scooter, which, however, has an increased transport volume compared to known scooters due to the provision of the storage compartment 5. In the upper position of the roof element 4, a wind and weather protection for the rider is obtained, as well as an increased transport volume due to the further enlarged volume of the storage compartment 5.

Due to the curved shape of the roof element 4 with the roof struts 7 and the cover 8, a very harmonious overall appearance of the body 2 and thus of the entire two-wheeled vehicle 1 is obtained in both positions of the roof element 4.

The roof element 4 can be locked in its two positions, that is in the first, lower position and in the second, upper position. For example, in the present case in the upper position of the roof element 4, the roof struts 7 are connected to a windshield frame 10 of the body 2 and it can be foreseen to provide roof struts 7 which are lockable with the windshield frame 10. Obviously, the locking of the roof struts 7 can also be achieved in a different region. In the lower position of the roof element 4, the locking of the roof struts 7 with a bottom group 11 of the body 2 of the two-wheeled vehicle 1 is conceivable. For example, it is also possible to lock the roof element 4 in the region of the axis of rotation 6, which would allow the locking of the roof element 4 in two positions and optionally in intermediate positions. Combinations of these solutions are also conceivable.

The windshield frame 10 is guided relatively far upwards and thus provides good wind and weather protection. The connection of the windshield frame 10 with the roof element 4 results in a completely closed body 2, at least on the upper side. In a manner not shown, corresponding covers, for example in the form of suitable tarpaulins or films, may be provided in both lateral regions of the body 2, in order to achieve an even better weather protection.

In a manner not shown, the roof struts 7 may be designed in such a way that they may be retracted into the roof element 4. Thus, the roof struts 7 would be no more on the sides of the rider's seat 9, but behind the same. This results in improved space, in particular for a passenger seated on the rider's seat 9. In their retracted position within the roof element 4, the roof struts 7 may also be locked, if required.

In the FIGS. 4 and 5 it can be seen that between the roof struts 7, a cover element 12 is provided, which can be adjusted between an open position, which is approximately reached in FIG. 4, and a closed position shown in FIG. 5. Of course, intermediate positions of the cover 12 are also conceivable. In the position of the roof element 4 according to FIG. 1, the cover element 12 should be located in its open position, so that the roof element 4 can be brought into its lower position without the cover element 12 colliding with the rider or the rider's seat 9.

The cover element 12 may be housed in a recess, not shown, in the storage compartment 5. There, the cover element 12 can be rolled up or wound up, for example, if it is made of flexible material. Instead of being a wound-up cover element 12, the cover element 12 can also be made of several parts and optionally foldable. Basically, the cover element 12 may, for example, consist of a suitable plastic material, in particular, depending on the design, of a plastic film or a harder plastic material.

Optionally, both the movement of the roof element 4 as well as the movement of the cover element 12 may be performed by means of a pneumatic, hydraulic or electric drive and may be optionally controlled. In the case of such control, it is of course conceivable, to bring the cover element 12 to its open position before the roof element 4 is brought into its lower position. However, a pure manual operation of the roof element 4 and/or of the cover element 12 is also conceivable.

For driving the two-wheeled vehicle 1, an electric motor, not shown, may be provided as a drive source. This can be arranged, for example, in a wheel hub of one of the wheels 3. Furthermore, batteries, or at least one battery, may be arranged in the bottom group 11 of the body 2, for providing this electric motor with electric power. However, this is also not shown in the figures. Optionally, the drive of the two-wheeled vehicle 1 may also be a conventional combustion motor. Of course, hybrid, plug-in hybrid and and other suitable power sources are also conceivable.

Figure 6:
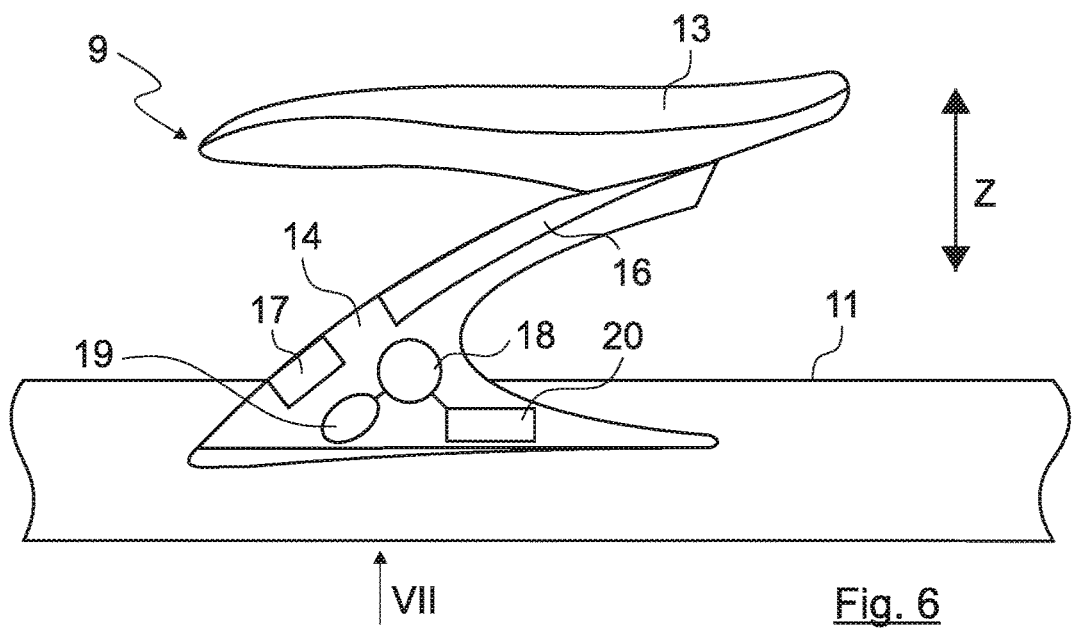
FIG. 6 is a side view of a rider's seat of the two-wheeled vehicle according to the invention.
Figure 7:
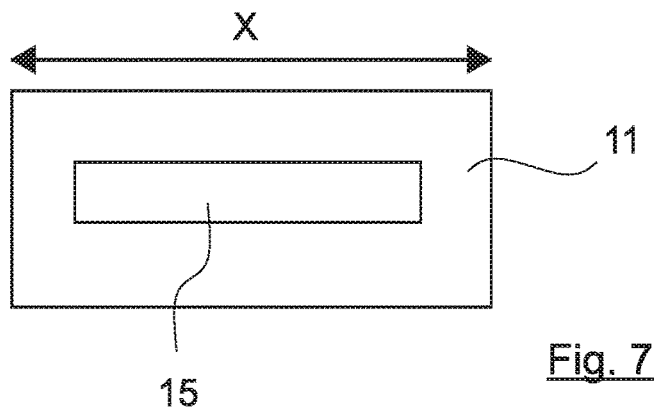
FIG. 7 is a view according to the arrow VII of FIG. 6.

FIGS. 6 and 7 show the rider's seat 9 of the two-wheeled vehicle 1 in a detailed representation. The rider's seat 9 has a seating surface 13, which in the present case is formed as a double seat bench, and a bracket 14 for connecting the seating surface 13 to the body 2, in the present case to the bottom group 11. Here, the bracket 14 is arranged in a displaceable manner relative to the body 2 in the longitudinal direction of the two-wheeled vehicle 1, which is marked with an "x". The seating surface 13 is arranged in a displaceable manner with respect to the bracket 14 at least in the vertical direction of the two-wheeled vehicle 1, which is marked with a "z".

As can be seen in the view of FIG. 7, the bracket 14 is guided in a guide 15 of the body 2, in the present case in the bottom group 11. The bracket 14 is in particular continuously displaceable within the guide 15 and is lockable with respect to the body 2. In order to lock the bracket 14 with respect to the guide 15 of the body 2, a quick release mechanism, not shown, may be used, for example.

FIG. 6 shows that the seating surface 13 is guided within a guide 16 in the bracket 14. The guide 16 in this case has a curved profile, so that an adjustment of the seating surface 13 relative to the bracket 14 in the vertical direction z is accompanied by an adjustment of the seating surface 13 in the horizontal direction. Preferably, the seating surface 13 is also continuously displaceable within the bracket 14.

The guides 15 and 16 in the illustrated embodiment are formed by a respective groove, into which a corresponding part of the bracket 14 and the seating surface 13 engages.

The bracket 14 also has a storage compartment 17, in which the user of the two-wheeled vehicle 1 can accommodate various objects and which, if appropriate, can be closed by a cover, not shown. Furthermore, in the present case, parts of a drive means of the two-wheeled vehicle 1 are arranged within the bracket 14. Specifically, this may be a very schematically shown electric motor 18, a transmission 19 and/or a battery 20. This electric motor 18, this transmission 19 and/or this battery 20 may be provided, in addition to or instead of the electric motor described above, which is arranged in the wheel 3 and in addition to or instead of the battery, which is arranged in the bottom group 11, as described above. The transmission 19 may be, for example, an automatic transmission and it may be formed, for example, as a belt transmission.

Figure 8:
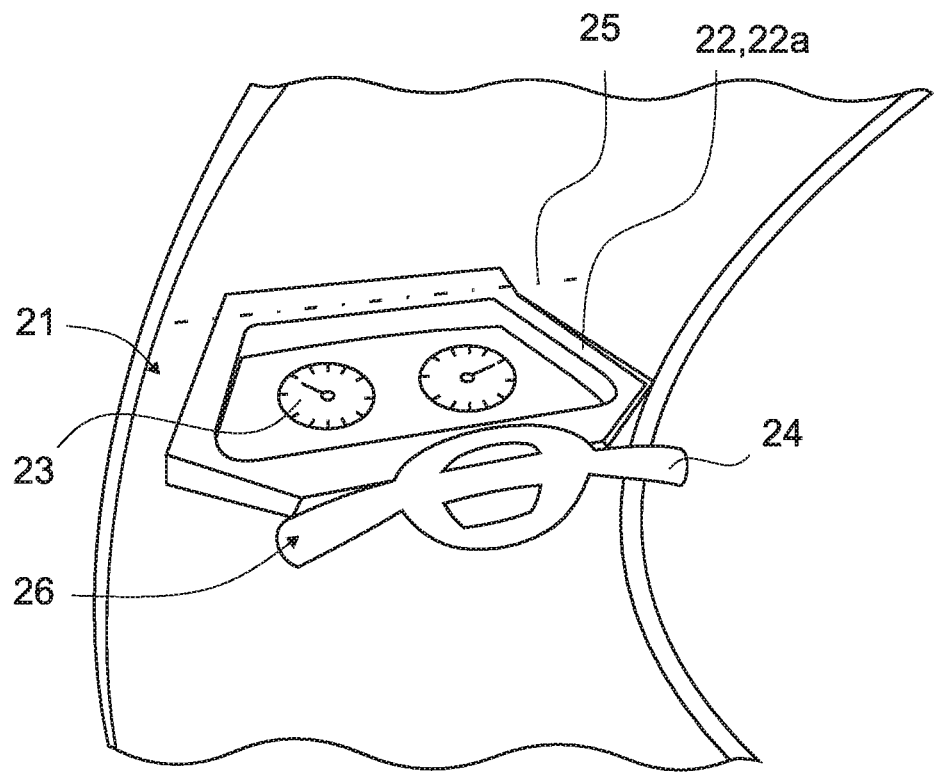
FIG. 8 is a perspective view of a cockpit of the two-wheeled vehicle in a first position.
Figure 9:
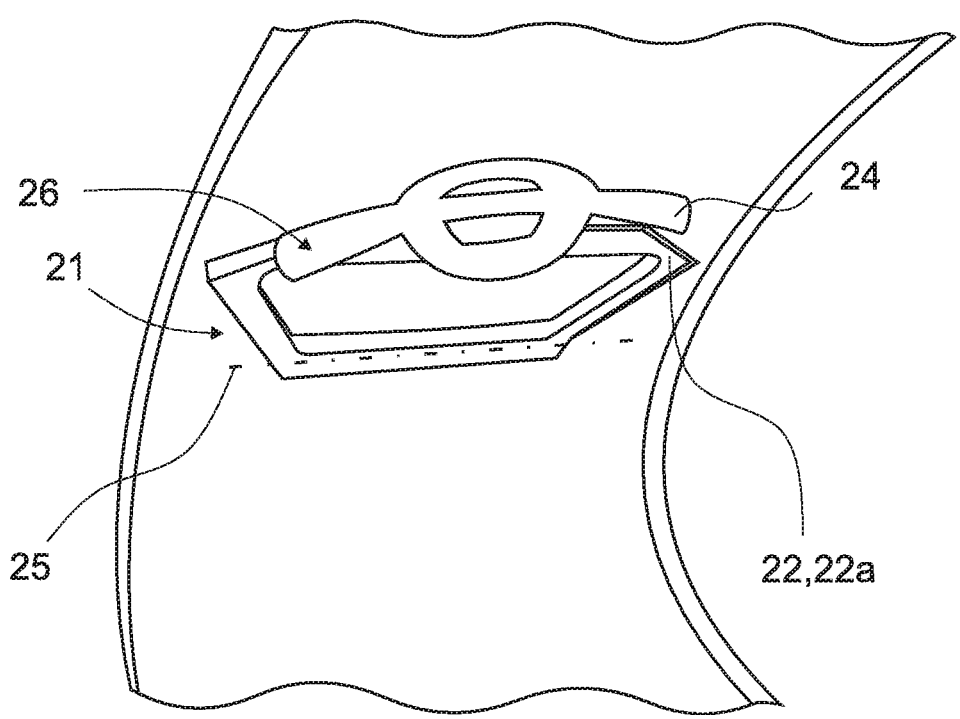
FIG. 9 is a view of the cockpit according to FIG. 8 in a second position.

FIGS. 8 and 9 show a cockpit 21 of the two-wheeled vehicle 1. The cockpit 21 has a base body 22 to which a display 23 and a handlebar or a steering handle 24 are attached.

To allow adaptation of the cockpit to different users or riders of the two-wheeled vehicle 1, the base body 22 is rotatably mounted on the body 2 of the two-wheeled vehicle 1. In the present case, the base body 22 is connected to the body 2 at an axis of rotation 25 extending at least approximately horizontally. The axis of rotation 25 is located here in the region of the windshield frame 10.

It can be provided that the base body 22 is lockable in at least two, possibly even more positions relative to the body 2. This lockability of the base body 22 relative to the body 2 can be ensured with a quick release mechanism, not shown, or a similar device. Additionally or alternatively, it is also possible to arrange the base body 22 in defined locking positions relative to the body 2.

The base body 22 is formed in the present case as a frame 22a, which surrounds the display 23 at least partially. In the illustrated exemplary embodiment, the frame 22a has a trapezoidal shape and surrounds the display 23 on all four sides.

The steering handle 24 or the handlebar has a plurality of operating elements 26. In the present case, the operating elements 26 include a throttle grip, a brake lever, and a turn signal actuator. Of course, further operating elements 26, such as a clutch lever, may be provided or various operating elements 26 can be omitted.

The connection of the steering handle 24 to the steered wheel 3 can also be adjusted when adjusting the cockpit 21. Furthermore, this connection can also be designed as a so-called drive-by-wire steering, which is known per se, so that there is no mechanical connection between the steering handle 24 and the front wheel 3.

Figure 10:
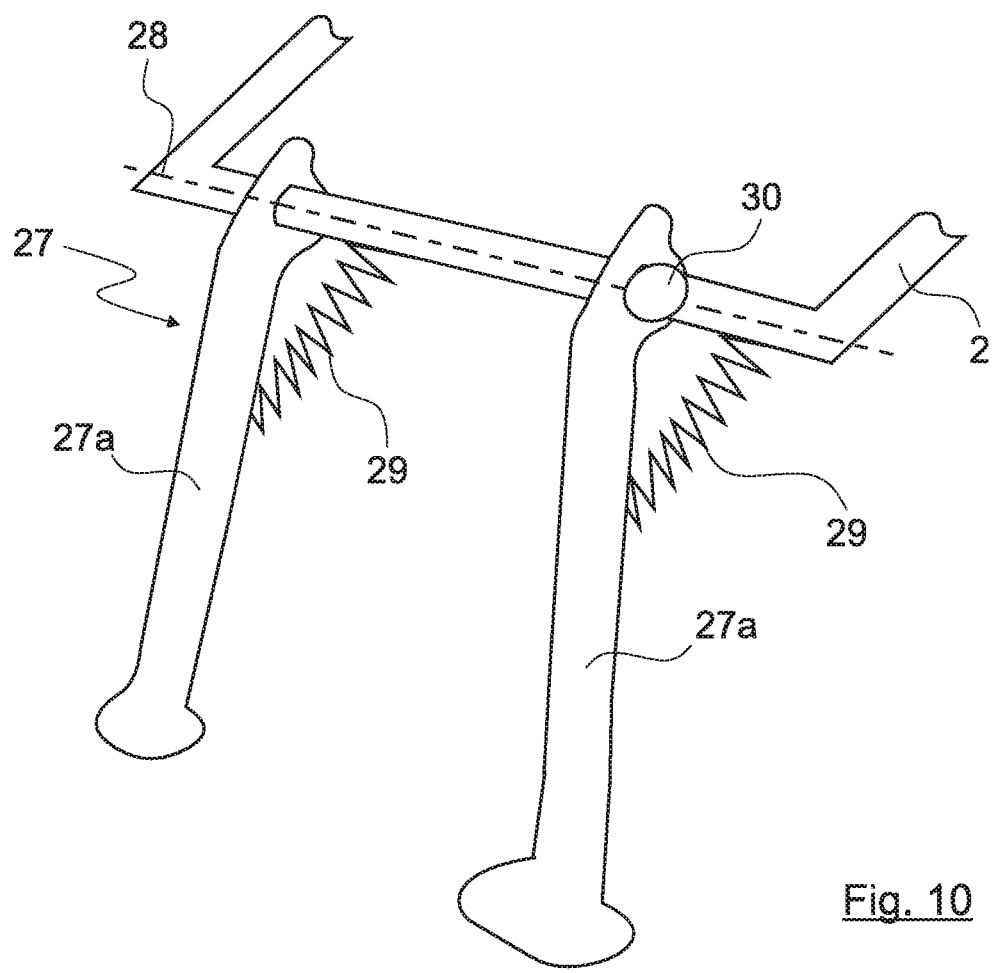
FIG. 10 shows a stand for the two-wheeled vehicle.

In FIG. 10, a stand 27 is shown, by means of which the two-wheeled vehicle 1 can be placed on the ground. The stand 27 has a stand portion 27a, which is rotatably mounted on the body 2 on an axis of rotation 28 between an upper position and a lower position. In the lower position of the stand portion 27a, the stand 27 provides support for the body 2 and thus for the two-wheeled vehicle 1 on the ground.

Furthermore, the stand 27 has a spring element 29, which is formed to urge the stand portion 27a downwards by means of the elastic force. In order to reset the stand portion 27a in the upper position, a drive means composed of an electric motor 30 is used in this case, in order to cause a rotational movement of the stand portion 27a about the axis of rotation 28 on the body 2. The electric motor 30 can be arranged directly on the rotation axis 28, on which the stand 27 is rotatably mounted on the body 2, for example.

The stand portion 27a can be moved downwards into such a position that the wheels 3 still rest on the ground. As a result, the spring element 29 would only have to be designed without the need to lift the entire weight of the two-wheeled vehicle 1 with it. Thus, the stand 27 in any case prevents the two-wheeled vehicle 1 from falling over. At its lower end, the stand portion 27a may be provided with wheels, not shown, which allow maneuvering of the two-wheeled vehicle 1 even when the stand 27 is folded down.

Furthermore, a locking means, not shown, may be provided, with which the stand portion 27a may be locked in the upper position, such that it is not necessary to operate the electric motor 30 continuously in order to keep the stand portion 27a in the upper position. In the present case, the stand portion 27a is formed substantially with a U-shape. However, it would also be possible to provide two independent stand portions 27a or only one stand portion 27a, which then would have the form of a side stand instead of a main stand.

All of the above-described locking devices or means of the individual components or elements of the two-wheeled vehicle 1 can be realized in many different ways, for example manually, pneumatically, hydraulically or electrically.

The invention claimed is:

1. A seat for a two-wheeled vehicle, comprising:
   a seating body; and
   a bracket connecting the seating body to a body of the two-wheeled vehicle,
   wherein the bracket is configured to be displaced relative to the body of the two-wheeled vehicle in a longitudinal direction of the two-wheeled vehicle, and the seating body is configured to be displaced relative to the bracket at least in a vertical direction of the two-wheeled vehicle,
   wherein the seating body is partially received within a guide of the bracket such that the guide of the bracket directs displacement of the seating body at least along the vertical direction of the two-wheeled vehicle, and
   wherein the guide of the bracket comprises a groove that is opening into the bracket, the groove comprising a curvilinear profile.

2. The seat according to claim 1, wherein the seating body is a double seat bench.

3. The seat according to claim 1, wherein the bracket is partially received in a guide of the body of the two-wheeled vehicle such that the guide of the body of the two-wheeled vehicle directs displacement of the bracket along the longitudinal direction of the two-wheeled vehicle.

4. The seat according to claim 3, wherein the bracket is continuously displaceable along the guide of the body of the two-wheeled vehicle and configured to be locked with respect to the body of the two-wheeled vehicle at one or more locking positions along the guide of the body of the two-wheeled vehicle.

5. The seat according to claim 4, further comprising:
a quick-release mechanism configured to lock the bracket with respect to the body of the two-wheeled vehicle at the one or more locking positions along the guide of the body of the two-wheeled vehicle.

6. The seat according to claim 1, wherein the bracket has a storage compartment.

7. The seat according to claim 6, wherein the storage compartment is configured to house at least one part of a powertrain of the two-wheeled vehicle.

8. The seat according to claim 7, wherein the at least one part of the powertrain housed in the storage compartment is selected from a group consisting of an electric motor, a transmission, and a battery.

9. A seat for a two-wheeled vehicle, comprising:
a seating body; and
a bracket connecting the seating body to a body of the two-wheeled vehicle,
wherein the bracket is configured to be displaced relative to the body of the two-wheeled vehicle in a longitudinal direction of the two-wheeled vehicle, and the seating body is configured to be displaced relative to the bracket at least in a vertical direction of the two-wheeled vehicle,
wherein the seating body is partially received within a guide of the bracket such that the guide of the bracket directs displacement of the seating body at least along the vertical direction of the two-wheeled vehicle, and
wherein the guide of the bracket comprises a curvilinear profile,
wherein the bracket has a storage compartment.

10. The seat according to claim 9, wherein the seating body is a double seat bench.

11. The seat according to claim 9, wherein the bracket is partially received in a guide of the body of the two-wheeled vehicle such that the guide of the body of the two-wheeled vehicle directs displacement of the bracket along the longitudinal direction of the two-wheeled vehicle.

12. The seat according to claim 9, wherein the bracket is continuously displaceable along the guide of the body of the two-wheeled vehicle and configured to be locked with respect to the body of the two-wheeled vehicle at one or more locking positions along the guide of the body of the two-wheeled vehicle.

13. The seat according to claim 9, further comprising:
a quick-release mechanism configured to lock the bracket with respect to the body of the two-wheeled vehicle at the one or more locking positions along the guide of the body of the two-wheeled vehicle.

14. The seat according to claim 9, wherein the storage compartment is configured to house at least one part of a powertrain of the two-wheeled vehicle.

15. The seat according to claim 14, wherein the at least one part of the powertrain housed in the storage compartment is selected from a group consisting of an electric motor, a transmission, and a battery.

* * * * *